United States Patent Office 3,579,571
Patented May 18, 1971

3,579,571
PROCESS FOR THE PREPARATION AND ISOLATION OF DEHYDROABIETIC ACID
Noah J. Halbrook and Ray V. Lawrence, Olustee, Fla., assignors to the United States of America as represented by the Secretary of Agriculture
No Drawing. Filed Nov. 13, 1967, Ser. No. 682,541
Int. Cl. C07c 61/30
U.S. Cl. 260—514.5
6 Claims

ABSTRACT OF THE DISCLOSURE

Dehydroabietic acid is separated from rosin, other rosin acids, and rosin materials either present in rosin or formed in the disproportionation of rosin, by forming the 2-aminoethanol salt of dehydroabietic acid and recovering the pure acid from the amine salt.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the separation of dehydroabietic acid from rosin, other rosin acids and rosin materials either present in rosin or formed in the disproportionation of rosin. More specifically, it deals with a method for disproportionating rosin, isolating about 80–90% of the dehydroabietic acid formed as the 2-aminoethanol salt and recovering a residue rich in a dihydroabietic acid. Dehydroabietic acid is characterized by excellent stability to air oxidation. The acid and its derivatives are useful as intermediates in the preparation of other organic compounds for industrial application and therapeutic purposes.

Although the use of amine salts for the separation of pure resin acids from mixtures of resin acids is well known, no amine and solvent system has previously been found that will permit the isolation of dehydroabietic acid from disproportionated or heat-treated rosin.

The term "rosin acids" includes all of the $C_{20}$ acids present in rosin and the dehydro-, dihydro-, and tetrahydro-acids formed during disproportionation of rosin. The term "rosin" includes gum, wood, and tall oil rosin. The term "rosin materials" refers to all of the products present in rosin and disproportionated rosin.

In addition to many other uses, some derivatives of dehydroabietic acid are used for therapeutic purposes. The dimethylaminoethyl, diethylaminoethyl and piperidinoethyl hydrochlorides of dehydroabietic acid are useful in treatment of arrhythmic conditions of the heart (P. Sefcovic, K. Babor, and V. Kalac, Chem. Zvest. 15 554 (1961); C. A., 56, 4872e (1962)). The 6-aryloxyacyl-dehydroabietic acid esters are active estrogenic agents (U.S. Pat. 2,973,332, issued Aug. 5, 1958). Dehydroabietic acid, in contrast to other rosin acids such as abietic acid, is stable to air and is used as a stable emulsifying agent in the manufacture of butadiene-styrene rubber.

Previously, the separation of dehydroabietic acid from disproportionated rosin involved preparation of derivatives of dehydroabietic acid in the crude mixture, purification of these derivatives by crystallization procedures and regeneration of the acid. Yields were low, usually less than 25% by weight of the rosin used. Using our procedure we can isolate pure dehydroabietic acid from disproportionated rosins of commerce in high yield; however, it is more conveniently separated from the specially prepared rosin containing mostly one isomeric dihydroabietic acid and dehydroabietic acid. A further product of our invention is the stabilized rosin acids, mostly dihydroabietic recovered as a residue after isolation of dehydroabietic acid. These stabilized rosin acids are superior to the original disproportionated rosin for the emulsion polymerization of (butadiene-styrene) GR-S rubber (Julian L. Azrolosa, Ind. Eng. Chem., 41, 1626–9 (1949)).

The art of disproportionating rosin or rosin acids with the aid of a catalyst to enrich the dehydroabietic acid content has been described by several authors. The most commonly used reagents to accomplish this are palladium, sulfur, sulfur dioxide, bromine, and iodine. Commercial samples of disproportionated rosin were found to contain about six or seven resin acids in varying ratios to one another, depending on the source and the method used in disproportionation or dehydrogenation.

During the preparation of disproportionated rosin we observed that when palladium was used as a catalyst and the disproportionation was carried out at about 200° C., a complex mixture of rosin acids was obtained. As this temperature was increased up to 340° C., the composition of this mixture gradually changed and the product was found to consist almost entirely of two modified rosin acids, a dihydroabietic acid and dehydroabietic acid. At the upper range of temperature, the acid content was lowered due to decarboxylation. The temperature for optimum yield of dehydroabietic acid was from 240 to 280° C. The temperature selected will depend also on the catalyst and amount used. We found that 0.02% to 2.0% of 5% palladium on carbon gave good results. The greater amounts of catalysts required less time and lower temperatures.

We have found a very efficient and simple procedure for the isolation of dehydroabietic acid from disproportionated rosin. The 2-aminoethanol salt of dehydroabietic acid will crystallize from solutions of water, ethyl alcohol and water, methyl alcohol and water, isopropylalcohol and water, benzene, isooctane and related hydrocarbons. The dehydroabietic salt is most conveniently isolated from alcohol solutions that contain from about 10 parts of alcohol to 90 parts of water to about 80 parts of alcohol to 20 parts of water. Precipitation of the amine salts from hydrocarbons does not isolate the dehydroabietic acid; however, it is a means of removing non-acidic material from the disproportionated rosin acids. These neutral materials may also be removed by extracting the hot aqueous alcohol solution of the rosin amine salt with isooctane or other immiscible hydrocarbons. Still another method of removing these neutrals is by washing the amine salt precipitate with the hydrocarbon. It is not necessary to remove these neutrals by extraction since most of them remain in suspension in the filtrate, but their removal allows the isolation of pure dehydroabietic acid with fewer recrystallizations. The 2-aminoethanol salt precipitate will contain up to 92% of the dehydroabietic acid in up to 99% purity. Pure dehydroabietic acid can be obtained after one to three recrystallizations of the disproportionated rosin used. The free dehydroabietic acid may be recovered from the amine salt by distilling off the 2-aminoethanol under vacuum at 125° to 140° C., by acidifying an alcoholic solution of the amine salt with a mineral acid such as hydrochloric, sulfuric or phosphoric and precipitating the rosin acid by addition of water and by extraction of the amine by shaking or stirring the amine salt with a dilute mineral acid. The 2-aminoethanol can be recovered in the usual manner and reused.

The following examples will serve to illustrate the manner of practicing our invention. Parts and percentages are by weight and temperature is indicated by degrees centigrade.

Examples 1 through 8 illustrate the preparation of disproportionated rosin from gum rosin and shows the variation in composition that is obtained using several catalyst concentrations over a temperature range in several steps, from 200° to 340° C. These examples do not show all the variations possible since a change in the type of catalyst or temperature used for the disproportionation can cause a change in composition of the product. Continued heating in the presence of a palladium catalyst causes an isomerization of the dihydro-acids first formed.

EXAMPLE 1

A one liter flask equipped with a stirrer, thermometer, inert gas inlet, water condenser and water trap was charged with 500 grams of gum rosin and 5 g. of 5% palladium on carbon. The rosin had an acid number of 166, and color grade WW. The ultraviolet spectrum of the rosin showed the presence of abietic-type acids, $$\lambda^{alcohol}_{maximum} \ 242 \ m\mu \ (\alpha = 32.1)$$

The flask was closed and a current of about 50 ml. per minute of nitrogen was started through. Heat was applied and when the rosin had melted, stirring was commenced and the temperature brought during 10–15 minutes to 200° C. and maintained at 200° C. for 2.5 hours. The resin was cooled to about 150° C. and poured in cardboard or metal container. The ultraviolet spectrum showed the absence of abietic-type acids, and $$\lambda^{alcohol}_{maximum} \ 268 \ m\mu \ (\alpha = 1.36); \text{ and } 268 \ m\mu \ (\alpha = 1.57)$$

indicating the presence of dehydroabietic acid. The acid number was 155.

EXAMPLE 2

This example is the same as Example 1, except that the temperature was brought to 240° C. and maintained at 240° for 0.5 hour. The ultraviolet spectrum showed the absence of abietic-type acids, and $$\lambda^{alcohol}_{maximum} \ 268 \ m\mu \ (\alpha = 1.92) \text{ and } 276 \ m\mu \ (\alpha = 1.98)$$

indicating the presence of dehydroabietic acid. The acid number was 161.

EXAMPLE 3

This example is the same as Example 1, except that 0.1% of 5% palladium on carbon was used and the temperature was brought to 260° C. and maintained at 260° C. for 0.3 hour. The ultraviolet spectrum showed the absence of abietic-type acids and $$\lambda^{alcohol}_{maximum} \ 268 \ m\mu \ (\alpha = 1.97) \text{ and } 276 \ m\mu \ (\alpha = 1.95)$$

indicating the presence of dehydroabietic acid. The acid number was 155.

EXAMPLE 4

This example is the same as Example 3, except that the temperature was maintained at 260° for 2.5 hours. The ultraviolet spectrum showed $$\lambda^{alcohol}_{maximum} \ 268 \ m\mu \ (\alpha = 1.86) \text{ and } 276 \ m\mu \ (\alpha = 1.84)$$

The acid number was 151.

EXAMPLE 5

This example is the same as Example 1, except that 0.1% of 5% palladium on carbon was used and the temperature was brought to 280° C. and maintained at 280° C. for 1 hour. The ultraviolet spectrum showed $$\lambda^{alcohol}_{maximum} \ 268 \ m\mu \ (\alpha = 1.80) \text{ and } 276 \ m\mu \ (\alpha = 1.86)$$

The acid number was 150.

EXAMPLE 6

This example is the same as Example 5, except 0.2% of 5% palladium on carbon was used. The ultraviolet spectrum showed $$\lambda^{alcohol}_{maximum} \ 268 \ m\mu \ (\alpha = 1.84) \text{ and } 276 \ m\mu \ (\alpha = 1.82)$$

The acid number was 150.

EXAMPLE 7

This example is the same as Example 1, except that 0.1% of 5% palladium on carbon was used and the temperature was brought to 300° C. and maintained at 300° C. for 0.8 hour. The ultraviolet spectrum showed $$\lambda^{alcohol}_{maximum} \ 268 \ m\mu \ (\alpha = 2.43) \text{ and } 276 \ m\mu \ (\alpha = 2.30)$$

A third maxima also was found in this product at 259 m$\mu$ ($\alpha = 2.43$) showing the presence of decomposition products. The acid number was 134.

EXAMPLE 8

This example is the same as Example 7, except that the temperature was brought to 340° C. for 0.7 hour. The ultraviolet spectrum showed $$\lambda^{alcohol}_{maximum} \ 268 \ m\mu \ (\alpha = 2.53) \text{ and } 276 \ m\mu \ (\alpha = 2.40)$$

A third maxima was also found in this product at 259 m$\mu$ ($\alpha = 2.80$) showing the presence of decomposition products. The acid number was 120.

The following table shows the variation in the composition of the rosin when treated as described in Examples 1 through 8. Methyl esters of the rosins were separated into component parts by gas-liquid chromatography with a 5% Versamide 900 resin on Chromosorb W. Each component gave a positive tetranitromethane test showing unsaturation. Resins prepared at lower temperatures were found to be the most heterogeneous. Increasing the time, temperature, and catalyst concentration, either singularly or collectively, tends to cause isomerization of some of the dihydro-acids first formed.

| Example No. | React. temp., °C | Time, hrs. | Cat., percent | Composition, percent by weight of disproportionated rosin [1] | | | | | | |
|---|---|---|---|---|---|---|---|---|---|---|
| | | | | 1 | [2] 2 | 3 | 4 | 5 | 6 | [3] 7 |
| 1 | 200 | 2.5 | 1.0 | | 2.3 | 1.9 | 8.1 | 3.2 | 6.6 | 62.0 |
| 2 | 240 | 0.5 | 1.0 | 4.5 | 14.0 | 2.5 | | 2.2 | 2.6 | 60.4 |
| 3 | 260 | 0.3 | 1.0 | 2.8 | 14.3 | 2.8 | | 1.8 | 2.9 | 60.3 |
| 4 | 260 | 2.5 | 1.0 | 3.1 | 16.5 | 0.47 | 0.30 | 0.9 | 0.6 | 59.0 |
| 5 | 280 | 1.0 | 0.1 | 2.3 | 9.1 | 3.4 | 2.3 | 4.3 | 3.2 | 60.3 |
| 6 | 280 | 1.0 | 0.2 | 2.6 | 14.3 | 1.4 | 0.7 | 1.2 | .78 | 60.0 |
| 7 | 300 | 0.8 | 0.1 | 1.5 | 11.3 | | | | | 59.0 |
| 8 | 340 | 0.7 | 0.1 | 1.5 | 8.7 | 3.2 | | | | 49.0 |

[1] Components found by gas-liquid chromatography.
[2] The dihydro-acid to which components 1, and 3 through 6 tend to isomerize.
[3] Percent by weight of dehydroabietic acid in the disproportionated rosin.

EXAMPLE 9

Step 1.—A solution of 100 g. of the resin prepared in Example 6 was dissolved in 250 ml. of alcohol and filtered through a 0.25 inch pad of filter aid. The solution was warmed to about 70° C. and 18 g. of 2-aminoethanol added, followed by addition of 250 ml. of water heated to 70–80° C.

The solution was stored in a closed container overnight. The amine salt which formed was separated and excess solvent removed by pulling a vacuum on the crystals under pressure of a rubber dam. The crystals were slurried in 250 ml. of cold 50% alcohol and the solvent removed under pressure of a rubber dam.

Step 2.—The moist amine salt was dissolved in alcohol and made to a volume of 160 ml. The solution was acidified (pH 4–5) with dilute hydrochloric acid. On cooling, crystal formation started and 100 ml. of water was added to give complete precipitation. The crystals were collected on a Buchner funnel and washed by pouring 300 ml. of hot water over them. The crystals were dried in a vacuum oven at 110° and 3 mm. pressure for 3 hours. The yield of dehydroabietic acid was 51.0 g. The purity by gas chromatography was 98.5% and the neutralization equivalent was 301.5 The theoretical neutralization equivalent is 300.4.

EXAMPLE 10

Step 1.—A solution of 100 g. of the resin of Example 6 was dissolved in 250 ml. of alcohol and filtered through a 0.25 inch pad of filter aid. The solution was warmed to about 70° C. and 18 g. of 2-aminoethanol added followed by addition of 250 ml. of water heated to 70–80° C. The hot solution was extracted with three 75 ml. portions of isooctane. The solution was heated between extractions as necessary to keep the temperature above 60° C. Crystallization of the amine salt of dehydroabietic acid commences at about 50° C. The solution was stored in a closed container overnight. The 2-aminoethanol salt of dehydroabietic acid which formed was separated by filtration. The salt was recrystallized from 250 ml. of ethyl alcohol.

Step 2.—The moist amine salt was dissolved in hot alcohol and made to a volume of 160 ml. The solution was acidified to pH 4–5 with dilute hydrochloric acid. After crystals had formed, 100 ml. of water was added slowly. The crystals were collected on a Buchner funnel and washed by pouring 300 ml. of hot water over them. The acid was recrystallized from 75 ml. of alcohol to which 25 ml. of water was added slowly after crystal formation had started. The crystals were again collected on the Buchner funnel as above and dried at 110° C. and 0.5 mm. pressure for 3 hours to give the pure acid, yield 36.0 g. The methyl ester showed only one peak on the gas chromatogram. The ultraviolet spectrum showed $$\lambda_{maximum}^{alcohol} \ 268 \ m\mu \ (\epsilon \ 674)$$

and 276 m$\mu$ ($\epsilon$ 738), $[a]_D+62.0$, melting point 171.5–172.5 neut. equiv. 300.1, calculated neutral equiv. 300.4.

EXAMPLE 11

250 g. of the disproportionated rosin prepared in Example 4 was dissolved in 250 cc. of isopropyl alcohol. This solution was added with rapid stirring to one liter of hot water containing 45 g. of 2-aminoethanol. The solution was extracted with 100 ml. of UM and p-naptha. On standing overnight, the solution crystallized. The aqueous alcohol solution was removed from the crystals by filtration. The crystals were removed from the filter and washed by slurrying in an additional 500 ml. of water. The aqueous filtrate and wash liquor was acidified to pH 4 with 6 N mineral acid. The resin which separated on acidification was dissolved in petroleum naphtha and washed free of mineral acid. The resin was recovered by distilling off the naphtha. This resin had an acid number of 158. An analysis of this resin by gas chromatography indicated that it consisted of 27% dehydroabietic acid, the remainder being made up of 5 or 6 dihydro-acids plus neutral products. This product was a clear, non-crystalline stabilized rosin.

EXAMPLE 12

A rosin disproportionated by the procedure described in U.S. Pat. No. 2,395,278 was used for isolation of dehydroabietic acid. It was different from the palladium catalyzed disproportionated rosins of Examples 1 through 8. None of component 2 (table, Example 8) was present and two components were found following component 7. The crude product had 42.5% by weight of dehydroabietic acid.

Twenty-five grams of the resin was dissolved in 35 ml. of isooctane at 80° C. The solution was extracted with 125 ml. of hot 10% alcohol containing 4.5 g. of 2-aminoethanol by stirring for 15 minutes and separating the aqueous phase. The aqueous phase was further extracted while hot with two 25 ml. portions of isooctane. The crystals which formed on standing overnight were separated on a Buchner funnel, and washed by slurrying with 100 ml. of cold 10% alcohol and filtered. The resin acid portion of the amine salt when analyzed by gas-liquid chromatography was found to contain 92.4% dehydroabietic acid.

This amine salt was recrystallized from 100 ml. of 95% alcohol and the crystals freed of the amine by suspending the salt in 100 ml. of 0.5 normal sulfuric acid, mixing thoroughly and allowing to stand for one day. The acid crystals were separated from the water washed with hot water and dried at 110° C. and 1 to 3 mm. pressure for three hours. The yield of dehydroabietic acid was 8.7 g. or 82% by weight of the dehydroabietic acid in the rosin; the purity as determined by gas-liquid chromatography was 99.2%.

EXAMPLE 13

Step 1.—A 500 g. charge of gum rosin from the lot used in Example 1 was charged to a 1 liter flask equipped with stirrer, thermometer, inert gas inlet, water condenser and water trap. A current of 15–20 ml. of nitrogen per minute was started through the flask. Heat was applied and when the rosin had melted stirring was commenced and the temperature raised to 360° C. The temperature was held at 360° C., with stirring under the current of nitrogen for 3.5 hours. The heat-treated rosin was cooled to 150° C. and poured in a cardboard container. The rosin had an acid number of 102, color grade N, and softening point (Ball and Ring) 65° C.

Methyl esters of the treated rosin were prepared and separated into component parts by gas-liquid chromatography. The rosin contained 25% dehydroabietic acid.

Step 2.—A solution of 40 g. of the rosin and 6.0 g. of 2-aminoethanol in 200 ml. of 40% alcohol was heated to 60° C. and extracted by shaking in a separatory funnel with 50 ml. of isooctane. The crystals which formed after standing for several days were collected and washed with 100 ml. of cold 40% alcohol. The set amine salt was dissolved in 15 ml. of alcohol and acidified with dilute hydrochloric acid to pH 4. Water was added until the solution clouded and crystallization started. The crystals which formed were collected and washed with water. Another crystallization from 10 ml. of alcohol by addition of water was made. The crystals were collected and dried at 100° C. and 3 min. pressure for 3 hours; a yield of 6.25 g. of dehydroabietic acid (78% of that in the disproportionated rosin) was obtained. Gas-liquid chromatography of the methyl ester showed the crystals to be 96% dehydroabietic acid.

Step 3.—A 155 gram sample of the heat-disproportionated rosin was vacuum distilled at 190° to 220° C. During distillation the pot was purged by introduction of water vapor from a capillary tube below the surface of the molten rosin. Forty grams of the rosin was distilled out and collected. A 15 g. portion containing 38% dehydroabietic acid was dissolved in 75 ml. of 40% alcohol and 3.0 g. of 2-aminoethanol added. The crystals which formed on standing one day were collected and freed of amine as in Step 2. A yield of 4.9 g. of dehydroabietic acid in 98% purity was obtained.

EXAMPLE 14

A solution of 100 g. of the resin prepared in Example 2 was dissolved in 1000 ml. of boiling water containing 18 g. of 2-aminoethanol. The solution was cooled to room temperature and crystals of the 2-aminoethanol separated by filtration. The salt was recrystallized from 500 ml. of water containing 1 g. of 2-aminoethanol. The moist amine salt was dissolved in enough alcohol to give a total volume of 80 ml. The solution was acidified to pH 4 with dilute hydrochloric acid. On cooling, crystal formation started and 60 ml. of water was added slowly. The crystals were collected on a Buchner funnel and washed with 100 ml.

hot water. A 35 gram yield of dehydroabietic acid was obtained.

EXAMPLE 15

A disproportionated rosin was prepared by heating gum rosin with 0.1% palladium catalyst over a temperature range of 150° to 215° C. When the ultraviolet spectrum showed the absence of abietic type acids heating was stopped. The disproportionated rosin had an acid number of 163.

A 100 g. portion was dissolved in 300 ml. of isooctane at 90° C., filtered and 4.2 g. of 2-aminoethanol added. The 2-aminoethanol salts of the resin acids which separated on cooling were collected and dried under vacuum to give 103.2 g. of amine salt. The resin acids from this salt had an acid number of 179. The methyl esters of the acids in the crude resin and the 2-aminoethanol precipitates from the isooctane were prepared as in Example 8 and separated into component parts by gas-liquid chromatography. The percent composition which follows is based on the acid portion of the rosin.

|  | Acid composition, percent by weight, neutrals free [1] | | | | | | |
|---|---|---|---|---|---|---|---|
|  | Dihydroabietic acids | | | | | | Dehydroabietic acid |
|  | 1 | 2 | 3 | 4 | 5 | 6 | 7 |
| Crude resin | 0.1 | 3.6 | 3.1 | 8.0 | 6.5 | 9.5 | 69.2 |
| Amine salt from isooctane | 0.9 | 3.5 | 8.1 | 7.0 | 7.5 |  | 73.0 |

[1] Components found by gas-liquid chromatography.

Step 2.—The amine salt, which precipitated from the isooctane was dissolved in 250 ml. of 50% alcohol at about 70°. The amine salt which crystallized on standing was separated, slurried in 250 ml. of cold (5°–10° C.) 50% alcohol and again separated. The dehydroabietic acid was recovered from the 2-aminoethanol salt following the procedure of Step 2, Example 9. The yield of dehydroabietic acid was 52.0 g. Purity by gas chromatography was 98%.

Step 3.—The alcohol liquors of Step 2 were acidified to pH 4–5 with dilute hydrochloric acid. The oil which separated was dissolved in 70 ml. of hexane and washed with 20 ml. portions of water until free of mineral acid. The hexane was evaporated and the residue dried at 3 mm. and 110° C. to give a hard resin, with acid number of 170. Analysis by gas chromatography showed that it contained 26% dehydroabietic acid. The remainder was made up of the dihydroabietic acids plus neutral products. This product is a non-crystalline, stabilized resin.

EXAMPLE 16

A mixture of 5 g. of the dehydroabietic acid obtained in Example 9, Step 2, suspended in 167 ml. of water is neutralized with 0.5 normal sodium hydroxide. The solution is poured into a 16 oz. bottle fitted for closure. To the solution is added in order, 0.3 g. of potassium persulfate in a 1% aqueous solution, 0.5 g. of lauroyl mercaptan, and a solution of 25 g. of styrene in 75 g. of butadiene. The bottle is sealed and the mixture gently agitated at 50° C. for 16 hours. The polymer emulsion is then poured into 30 ml. of a 2% water solution of hydroquinone. The excess butadiene is removed by evaporation on a steam bath, and the polymer precipitated by adding a saturated sodium chloride solution. The precipitated polymer is washed with water then with alcohol, then dried for 3 hours at 80° C. and 15 mm. pressure.

The amount of polymer obtainable by this procedure is 88% of that theoretically possible. A similar test using a portion of the original disproportionated rosin from which the palladium on carbon has been removed leads to the formation of only 41% polymer. An improvement of 210% is obtained by using the purified dehydroabietic acid over the disproportionated rosin.

EXAMPLE 17

Methyl esters of the stabilized resin of Example 15, Step 3, were analyzed by gas-liquid chromatography. The acid portion of the resin was found to contain 74% of dihydroabietic acids and 26% dehydroabietic acid.

A closed reaction vessel was charged with 100 grams of the stabilized resin and 1 gram of calcium hydroxide. Heat was applied and the resin heated with stirring under a slow stream of nitrogen to 235° C. and held for 15 minutes. The temperature was lowered to 190° to 200° C. and ethylene oxide sparged through the rapidly stirred resin. During one-half hour 13 grams of ethylene oxide condensed with the resin and the acid number dropped to zero. This monoglycol ester was diluted with toluene and washed with dilute mineral acid to remove the calcium salts. A clear ester, color grade WW on the rosin scale was obtained on removal of the toluene. The ester was returned to the reaction flask along with 105 grams of fumaric acid and 86 grams of diethylene glycol. The mixture was heated with stirring under a slow current of nitrogen at 190° C. for 5 hours. The water formed during esterification was condensed in a water cooled condenser and collected in a trap. The unsaturated polyester had a color grade N on the rosin scale and an acid number of 20.

A 70% solution of the ester in styrene was prepared. This solution had a viscosity of 2 poises when freshly prepared. It was cured (using 1½% benzoyl peroxide as a catalyst) in a chromium plated mold spaced to give a 0.125 inch thick sheet, by heating at 120° C. for 4 hours. The casting was clear and tough. It had a Barcol hardness of 44 on the Model GYZJ 934–1 Barber-Coleman Impressor.

EXAMPLE 18

The 2-aminoethanol salt of dehydroabietic acid was prepared in the manner described in Step 1 of Example 9.

The crystals were placed in a 500 ml. flask and heated to 135° C. at a pressure of 2 mm. Hg for 3 hours. Under these conditions the 2-aminoethanol was volatilized leaving the dehydroabietic acid in the flask. The yield of dehydroabietic acid was 52 grams having a purity of 98%.

We claim:
1. A process for obtaining dehydroabietic acid from rosin comprising
   (a) heating rosin in the persence of a palladium catalyst at a temperature of about 200°–340° C. for a period of about 0.7 to 2.5 hours;
   (b) dissolving the resulting reaction mixture in a hot aqueous alcohol solution containing 10 to 80 parts of alcohol per 100 parts of alcohol solution;
   (c) adding sufficient 2-aminoethanol to said aqueous alcohol solution to combine with all of the rosin acids present in said solution;
   (d) warming the product from step (c) to about 50–75° C., adding a hydrocarbon solvent to extract neutrals, and permitting the solution to cool to cause a precipitate of the 2-aminoethanol salt of a dehydroabietic acid to form;
   (e) dissolving said precipitate in alcohol; and
   (f) recovering free dehydroabietic acid by reacting the dissolved 2-aminoethanol salt with a mineral acid.

2. A process for obtaining dehydroabietic acid from rosin comprising
   (a) heating rosin in the persence of a palladium catalyst at a temperature of about 200°–340° C. for a period of about 0.7 to 2.5 hours;
   (b) cooling the resulting reaction mixture;
   (c) dissolving said reaction mixture in hot alcohol;
   (d) adding sufficient 2-aminoethanol to said hot alcohol solution to combine with all of the rosin acids present therein;
   (e) adding an amount of water sufficient to produce in said solution about from 10 to 80 parts of alcohol in 100 parts of solution;

(f) adding a hydrocarbon solvent to the aqueous alcohol solution from step (e) to extract neutrals therefrom and permitting the crystalline 2-aminoethanol salt of dehydroabietic acid to precipitate from the aqueous fraction; and (g) reacting said crystalline salt with dilute mineral acid.

3. A process for obtaining dehydroabietic acid from rosin comprising:
(a) heating rosin in the presence of a palladium catalyst at a temperature of about 200°–340° C. for a period of about 0.7 to 2.5 hours;
(b) cooling and then dissolving the resulting reaction mixture in alcohol;
(c) adding sufficient 2-aminoethanol to combine with all of the rosin acids in the alcohol solution;
(d) adding an amount of water sufficient to produce in said solution about from 10 to 80 parts of alcohol in 100 parts of solution whereby a crystalline precipitate of the 2-aminoethanol salt of dehydroabietic acid is formed;
(e) dissolving said crystalline precipitate in hot isooctane; and
(f) adding a mineral acid to said hot isooctane solution to produce a crystalline precipitate of free dehydroabietic acid.

4. A process for obtaining dehydroabetic acid from rosin comprising:
(a) heating rosin in a nitrogen atmosphere in the presence of a palladium catalyst at a temperature of about 200°–340° C. for a period of about 0.7 to 2.5 hours;
(b) cooling and then dissolving the resulting reaction mixture in hot alcohol;
(c) adding to the hot alcohol solution an amount of 2-aminoethanol sufficient to combine with all of the rosin acids present therein;
(d) adding to the solution resulting from step (c) an amount of water sufficient to produce about from 10 to 80 parts of alcohol in 100 parts of solution whereby a crystalline precipitate of the 2-aminoethanol salt of dehydroabietic acid is formed; and
(e) removing 2-aminoethanol from said crystalline salt by subjecting the latter to a vacuum.

5. A process for obtaining dehydroabietic acid from rosin comprising:
(a) heating rosin in nitrogen atmosphere in the presence of a palladium catalyst at a temperature of about 200°–340° C. for a period of about 0.7–2.5 hours;
(b) cooling and then dissolving the resulting reaction mixture in sufficient hydrocarbon solvent to produce a solution containing about 25% reaction product and 75% solvent;
(c) heating said solution to a temperature of about 70° C.;
(d) adding sufficient 2-aminoethanol to react with all of the acids present in said solution;
(e) cooling the solution resulting from step (d) to produce a precipitate of a mixture of 2-aminoethanol salts of dehydroabietic acid and dehydroabietic acids;
(f) dissolving said precipitate in aqueous alcohol and recrystallizing substantially pure 2-aminoethanol salt of dehydroabietic acid; and
(g) recovering dehydroabietic acid from said salt by treating the latter with a mineral acid.

6. A process for obtaining a noncrystalline stabilized resin rich in dihydroabietic acid from rosin comprising:
(a) heating rosin in a nitrogen atmosphere in the presence of a palladium catalyst at a temperature of about 200°–340° C. for a period of about 0.7–2.5 hours;
(b) cooling and then dissolving the resulting reaction mixture in alcohol;
(c) adding sufficient 2-aminoethanol to the dissolved reaction mixture to combine with all of the acids present;
(d) adding an amount of water sufficient to produce from 10 to 80 parts of alcohol in 100 parts of solution;
(e) extracting neutrals and dihydro-acids from the aqueous alcohol solution with a hydrocarbon solvent and allowing crystals of the 2-aminoethanol salt of dehydroabietic acid from the aqueous alcohol phase;
(f) decomposing said salt with a mineral acid to recover dehydroabietic acid;
(g) acidifying the aqueous alcohol mother liquor from step (e) to a pH of about 4.0–5.0 with dilute mineral acid;
(h) separating a mixture of dihydroabietic acids and neutrals from said acidified mother liquor; and
(i) drying the mixture from step (h) by heating at 100°–150° C.

References Cited
UNITED STATES PATENTS

| | | | |
|---|---|---|---|
| 1,995,600 | 3/1935 | Borglin et al. | 87—2 |
| 2,503,238 | 4/1950 | Gayer | 260—514.5 |

CHARLES B. PARKER, Primary Examiner

R. GERSTL, Assistant Examiner

U.S. Cl. X.R.
260—501.17